(12) United States Patent
Kumar et al.

(10) Patent No.: US 11,755,229 B2
(45) Date of Patent: Sep. 12, 2023

(54) ARCHIVAL TASK PROCESSING IN A DATA STORAGE SYSTEM

(71) Applicant: EMC IP Holding Company LLC, Hopkinton, MA (US)

(72) Inventors: Shiv Shankar Kumar, Pune (IN); Avadut Mungre, North Goa (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 268 days.

(21) Appl. No.: 16/911,814

(22) Filed: Jun. 25, 2020

(65) Prior Publication Data

US 2021/0405878 A1  Dec. 30, 2021

(51) Int. Cl.
*G06F 12/00* (2006.01)
*G06F 3/06* (2006.01)
*G06F 21/62* (2013.01)
*G06F 21/60* (2013.01)

(52) U.S. Cl.
CPC ............ *G06F 3/065* (2013.01); *G06F 3/0604* (2013.01); *G06F 3/067* (2013.01); *G06F 3/0619* (2013.01); *G06F 3/0653* (2013.01); *G06F 3/0659* (2013.01); *G06F 3/0683* (2013.01); *G06F 21/602* (2013.01); *G06F 21/6218* (2013.01)

(58) Field of Classification Search
CPC .... G06F 3/0604; G06F 3/0619; G06F 3/0653; G06F 3/0671
USPC ....................................................... 711/154
See application file for complete search history.

(56) References Cited

U.S. PATENT DOCUMENTS

| | | | | |
|---|---|---|---|---|
| 9,247,182 | B2 * | 1/2016 | Barnea | H04N 21/47 |
| 9,258,371 | B1 * | 2/2016 | Lai | H04L 67/51 |
| 9,397,987 | B1 * | 7/2016 | Lai | G06Q 30/0601 |
| 10,296,594 | B1 * | 5/2019 | Datta | G06F 16/128 |
| 11,436,073 | B2 * | 9/2022 | Kulli | G06F 16/1873 |
| 2005/0148311 | A1 * | 7/2005 | Anderson | H04B 7/0691 |
| | | | | 370/458 |
| 2005/0210465 | A1 * | 9/2005 | Sasaki | G06F 8/65 |
| | | | | 717/169 |
| 2006/0112151 | A1 * | 5/2006 | Manley | G06F 16/184 |
| 2007/0179990 | A1 * | 8/2007 | Zimran | G06F 16/185 |
| 2008/0294748 | A1 * | 11/2008 | Brown | H04L 67/565 |
| | | | | 709/219 |
| 2009/0300076 | A1 * | 12/2009 | Friedman | G06F 11/3664 |
| | | | | 707/999.203 |
| 2014/0016468 | A1 * | 1/2014 | Daraiseh | H04L 45/24 |
| | | | | 370/235 |
| 2015/0154271 | A1 * | 6/2015 | Iwasaki | G06F 16/27 |
| | | | | 707/618 |

(Continued)

*Primary Examiner* — Mohamed M Gebril
(74) *Attorney, Agent, or Firm* — Amin, Turocy & Watson, LLP

(57) ABSTRACT

Archival task processing in a data storage system is described herein. A method as described herein can include designating, by a device operatively coupled to a processor, a file stored by a primary cluster of a data storage system for archival to a remote storage system; locating, by the device, a secondary cluster of the data storage system having stored thereon a copy of the file, the secondary cluster being distinct from the primary cluster; and, in response to determining that the file stored by the primary cluster matches the copy of the file stored by the secondary cluster, causing, by the device, the secondary cluster to archive the copy of the file to the remote storage system.

20 Claims, 12 Drawing Sheets

(56) References Cited

U.S. PATENT DOCUMENTS

| | | | | |
|---|---|---|---|---|
| 2016/0140141 A1* | 5/2016 | Darcy | ................ | H04L 67/1023 |
| | | | | 707/827 |
| 2017/0003890 A1* | 1/2017 | Yoneya | ................ | G06F 3/0689 |
| 2017/0060705 A1* | 3/2017 | Sridhara | ............. | G06F 11/1662 |
| 2017/0091222 A1* | 3/2017 | Neumann | ............. | G06F 16/184 |
| 2017/0093798 A1* | 3/2017 | McKinion | ........... | G06F 16/2365 |
| 2017/0177452 A1* | 6/2017 | Parab | .................... | G06F 3/0641 |
| 2019/0340190 A1* | 11/2019 | Ganteaume | ............ | G10L 15/34 |
| 2019/0370136 A1* | 12/2019 | Smeaton | ............. | G06F 11/1451 |
| 2020/0213092 A1* | 7/2020 | Shim | ..................... | H04L 9/0866 |
| 2020/0257593 A1* | 8/2020 | Zhou | ....................... | H04L 67/34 |
| 2021/0405878 A1* | 12/2021 | Kumar | ................. | G06F 3/0683 |

* cited by examiner

ARCHIVAL TASK PROCESSING IN A DATA STORAGE SYSTEM

TECHNICAL FIELD

The subject application is related to data storage, and more particularly, to techniques for managing data archival in a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms, provide the means by which these large sets of data can be maintained in an efficient and reliable way.

In order to accommodate limitations in local storage capacity, an NAS system can facilitate the archival of various data to a remote storage system, such as a system associated with a cloud storage platform. For instance, an NAS system can process archival jobs or tasks for rarely used files that are stored by the NAS system, such as files on the system that have not been accessed within a threshold period of time.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system can include a memory that stores executable components and a processor that executes the executable components stored in the memory. The executable components can include a file designation component that selects a file stored by a primary computing cluster of the data storage system for archival to a remote storage system, a cluster selection component that locates a copy of the file at a secondary computing cluster of the data storage system that is distinct from the primary computing cluster, and an archival management component that, in response to determining that the copy of the file as stored by the secondary computing cluster matches the file stored by the primary computing cluster, directs the secondary computing cluster to archive the copy of the file to the remote storage system.

In another aspect, a method is described herein. The method can include designating, by a device operatively coupled to a processor, a file stored by a primary cluster of a data storage system for archival to a remote storage system; locating, by the device, a secondary cluster of the data storage system having stored thereon a copy of the file, the secondary cluster being distinct from the primary cluster; and, in response to determining that the file stored by the primary cluster matches the copy of the file stored by the secondary cluster, causing, by the device, the secondary cluster to archive the copy of the file to the remote storage system.

In an additional aspect, a machine-readable medium including executable instructions is described herein. The instructions, when executed by a processor of a data storage system, can facilitate performance of operations including selecting a file stored at a primary site of a data storage system for archival to a remote storage system, identifying a secondary site of the data storage system that contains a copy of the file, and in response to determining that the file stored at the primary site matches the copy of the file stored by the secondary site, directing the secondary site to archive the copy of the file to the remote storage system.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Figure 1:
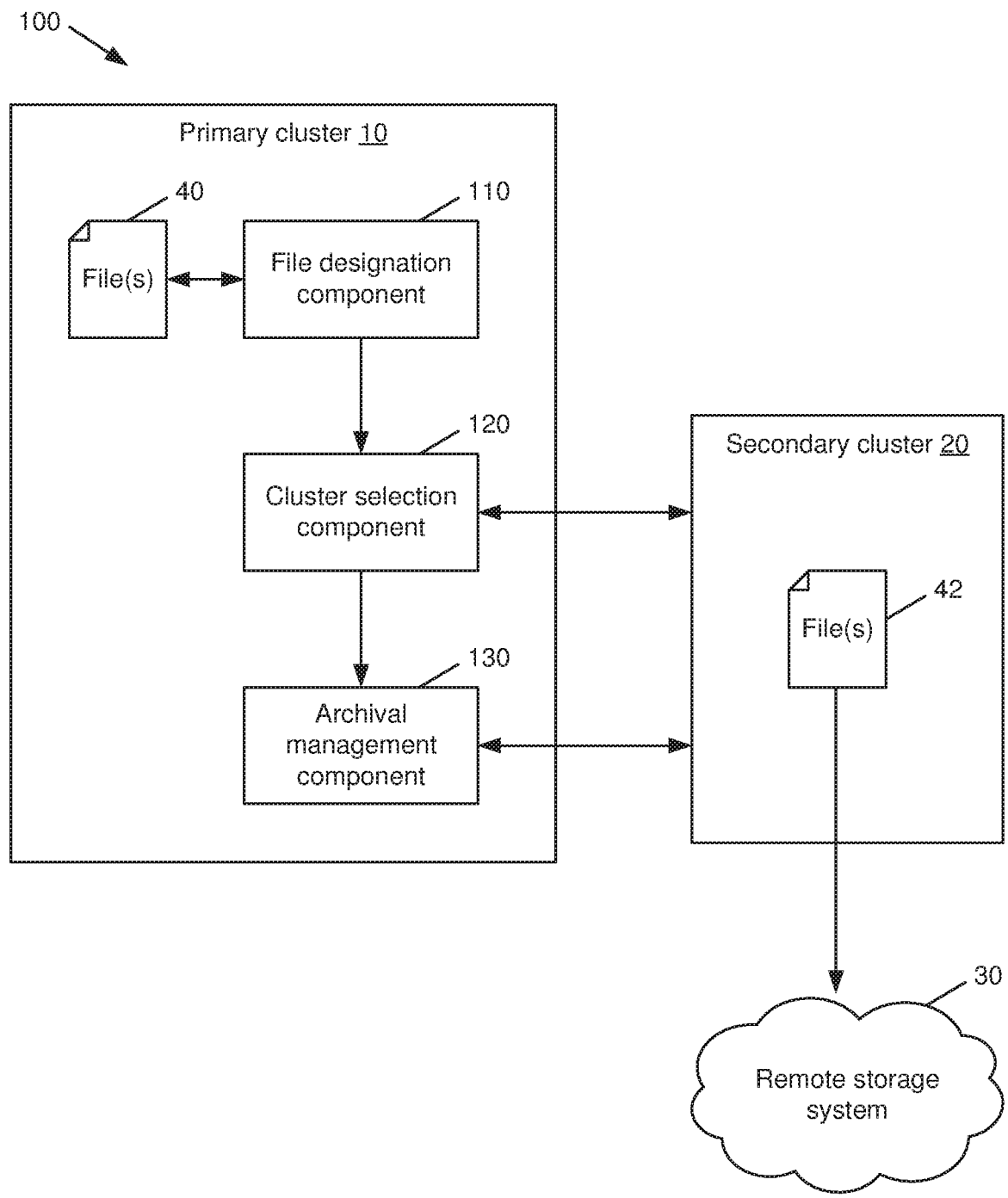
FIG. 1 is a block diagram of a system that facilitates archival task processing in a data storage system in accordance with various aspects described herein.

With reference now to the drawings, FIG. 1 illustrates a block diagram of a system 100 that facilitates archival task (job) processing in a data storage system in accordance with various aspects described herein. In an aspect, system 100 can utilize a replication facility for disaster recovery in order to enhance the security of data stored by system 100. For instance, system 100 as shown in FIG. 1 includes a primary storage cluster 10, referred to herein as simply a "primary cluster," and one or more secondary storage clusters 20, referred to herein as simply "secondary clusters." While only one secondary cluster 20 is illustrated in FIG. 1, it should be appreciated that system 100 can include any suitable number of secondary clusters 20.

In an aspect, recurring replication jobs can be defined via replication policies on the primary cluster 10 to replicate stored data to the secondary cluster(s) 20. While the primary cluster 10 and secondary cluster 20 are shown in FIG. 1 as being distinct entities, e.g., associated with different computing sites, it should be appreciated that respective clusters associated with a data storage system can be hosted within a same site, distributed among several sites, and/or configured in any other suitable manner Data replication from a primary cluster 10 to a secondary cluster 20 is described in further detail below with respect to FIG. 5.

In addition to replication, the primary cluster 10 as shown in system 100 can be tasked with serving client input/output (I/O) requests. While the primary cluster 10 actively serves I/O requests, the secondary cluster 20 can remain idle, e.g., to await any failure conditions on the primary cluster 10 in order to become active.

Moreover, the primary cluster 10 can execute archival jobs to send rarely used files or data to a remote storage system 30, such as a cloud storage system or the like. However, these archival jobs can consume resources of the primary cluster 10, e.g., in terms of power consumption, processor cycles, network bandwidth, etc. For instance, the primary cluster 10 can consume resources associated with determining which files to process, which files to send to the remote storage system, etc., as well as the network bandwidth associated with performing the file transfer(s). This, in turn, can reduce the performance of the primary cluster 10 and adversely impact client I/O requests. Once respective files are archived via the primary cluster 10, a subsequent replication job can replicate the resulting information to the secondary cluster 20.

In an aspect, system 100 can reduce the impact of archival jobs on the performance of the primary cluster 10 as noted above by offloading archival operations to one or more associated secondary clusters 20 under various conditions. Since the secondary cluster(s) 20 associated with the primary cluster 10 would otherwise be idle awaiting a failover event from the primary cluster 10, these operations can be shifted to the secondary cluster(s) 20 with minimal impact on overall system performance. As a result, the primary cluster 10 can assign more of its resources to serve client I/O requests while utilizing the computing capacity of secondary cluster(s) 20 to achieve file archival. Accordingly, various embodiments as described herein provide advantages that improve the functionality of the primary cluster 10 in terms of resource utilization, e.g., in terms of processor cycles, memory usage, power consumption, network bandwidth, etc. Other advantages of the embodiments described herein can also be realized.

As shown by FIG. 1, system 100 can achieve the foregoing and/or related ends via a file designation component 110, a cluster selection component 120, and an archival management component 130, each of which are described in further detail below. While the components 110, 120, 130 are each shown in FIG. 1 as being associated with a single primary cluster 10, it should be appreciated that the components 110, 120, 130 could be implemented in any suitable manner across any number of computing devices or clusters. Also or alternatively, the operations described below with respect to each of the individual components 110, 120, 130 could themselves be distributed over one or more computing devices or clusters, e.g., such that the functionality of a single component is distributed across multiple computing devices or clusters. Other implementations are also possible.

In an aspect, the file designation component 110 of system 100 can select a file 40 that is stored by the primary cluster 10 of system 100 for archival to a remote storage system 30. The file designation component 110 can select files for archival based on their respective access histories. For instance, the file designation component 110 can select a file 40 for archival if it has not been accessed within a threshold period of time, if it has been accessed less than a threshold number of times in a defined time interval, etc. Additionally, the file designation component 110 can designate files for archival on a regular and/or ongoing basis, e.g., according to a schedule, and/or in response to various conditions, such as the amount of available storage space associated with the primary cluster 10 falling below a threshold.

As further shown in FIG. 1, system 100 includes a cluster selection component 120 that can locate a copy 42 of a file 40 selected by the file designation component 110 at a secondary cluster 20. Techniques that can be utilized by the cluster selection component 120 for selecting an appropriate secondary cluster 20 are described below with respect to FIGS. 2-4. System 100 as shown by FIG. 1 additionally includes an archival management component 130 that, in response to determining that the copy 42 of the file 40 as stored by the secondary cluster 20 matches the file 40 as stored by the primary cluster 10, directs the secondary cluster 20 to archive the copy 42 of the file 40 to the remote storage system 30 in place of the file 40 as stored by the primary cluster 10. Techniques that can be utilized by the archival management component 130 to determine whether the copy 42 of the file 40 at the secondary cluster 20 matches the file 40 at the primary cluster 10 are described in further detail below with respect to FIGS. 6-7, and techniques that can be utilized for directing archival of the copy 42 of the file 40 via the secondary cluster 20 are described in further detail below with respect to FIGS. 8-10.

Figure 2:
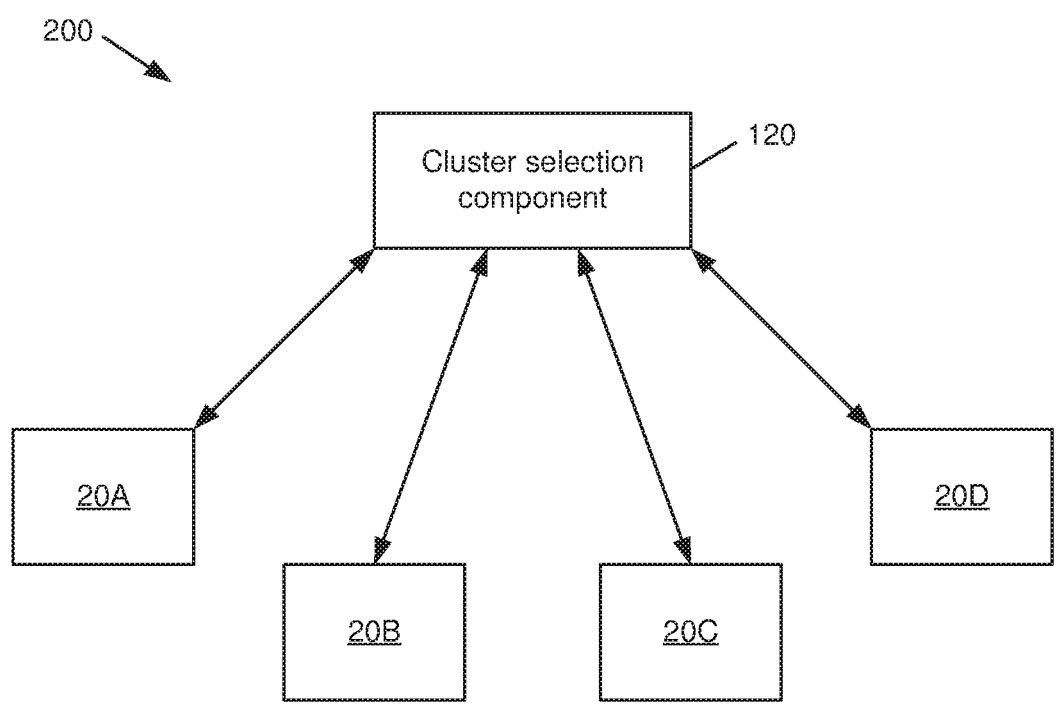
FIG. 2 is a block diagram of a system that facilitates selecting a secondary cluster for data archival in accordance with various aspects described herein.

Turning now to FIG. 2, a block diagram of a system 200 that facilitates selecting a secondary cluster 20 for data archival in accordance with various aspects described herein is illustrated. Repetitive description of like elements employed in other embodiments described herein is omitted for brevity. In an aspect, a single primary cluster 10 may be associated with multiple secondary clusters 20. For instance, multiple replication policies can be created on a primary cluster 10, and those replication policies in turn can be associated with one or more secondary clusters 20. These replication policies can define replication tasks on a per-volume or per-folder basis, as well as any other suitable bases. By way of example, a first replication policy can be utilized to replicate data stored by a primary cluster 10 that is associated with a heightened level of security (e.g., confidential information such as medical records or the like) or importance (e.g., mission criticality, user-defined priority, etc.) to a first designated secondary cluster 20, and a second replication policy can be used to replicate remaining data stored on the primary cluster 10 to another designated secondary cluster 20. As another example, multiple replication policies can be put into place to replicate data stored at a single primary cluster 10 to multiple secondary clusters 20, e.g., clusters located at different physical sites in order to mitigate the effects of a power outage or other computing site failure.

As a result of multiple replication policies as described above and/or other factors, a primary cluster 10 can be associated with multiple secondary clusters 20, each of which can potentially contain a copy of a given file 40 to be archived. While FIG. 2 illustrates an example including four secondary clusters 20A-20D, it should be appreciated that the secondary clusters 20A-20D shown in FIG. 2 are for illustrative purposes only and that any number of secondary clusters 20 is possible.

In an aspect, the cluster selection component 120 can select a secondary cluster 20 to utilize for archival job execution based on various factors, such as availability of a given file 40 on the respective secondary clusters 20A-20D, similarity of configurations (e.g., with respect to hardware configurations, operating system version and/or other software parameters, etc.) between a primary cluster 10 associated with the cluster selection component 120 and the respective secondary clusters 20A-20D, and/or other factors.

Figure 3:
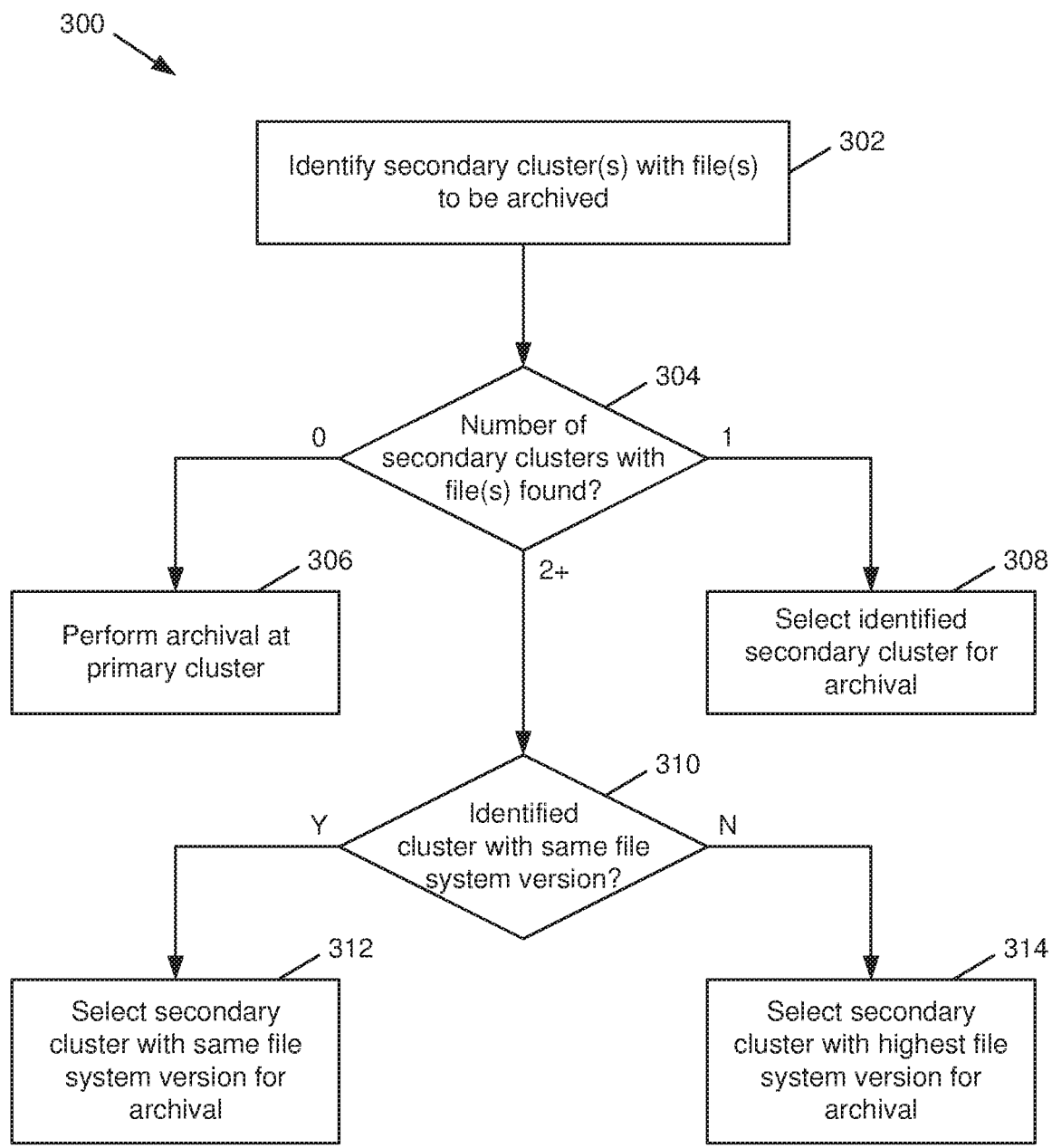
FIG. 3 is a block diagram of a system that facilitates conditional data archival from a primary cluster of a data storage system in accordance with various aspects described herein.

By way of non-limiting example, a flow diagram of a method 300 that can be utilized by the cluster selection component 120 for choosing a secondary cluster 20 for archival job execution is illustrated by FIG. 3. Method 300 begins at 302, in which respective secondary clusters 20 that have copies of a file designated for archival (e.g., a file 40 as designated by a file designation component 110) are identified. For instance, if multiple replications policies are set up on a primary cluster 10 as described above to migrate different folders, files and/or other subdivisions of data stored on the primary cluster 10 to different secondary clusters 20, the cluster selection component 120 can initially restrict a set of candidate secondary clusters at 302 to only those secondary clusters 20 that contain copies of the designated file.

Figure 4:
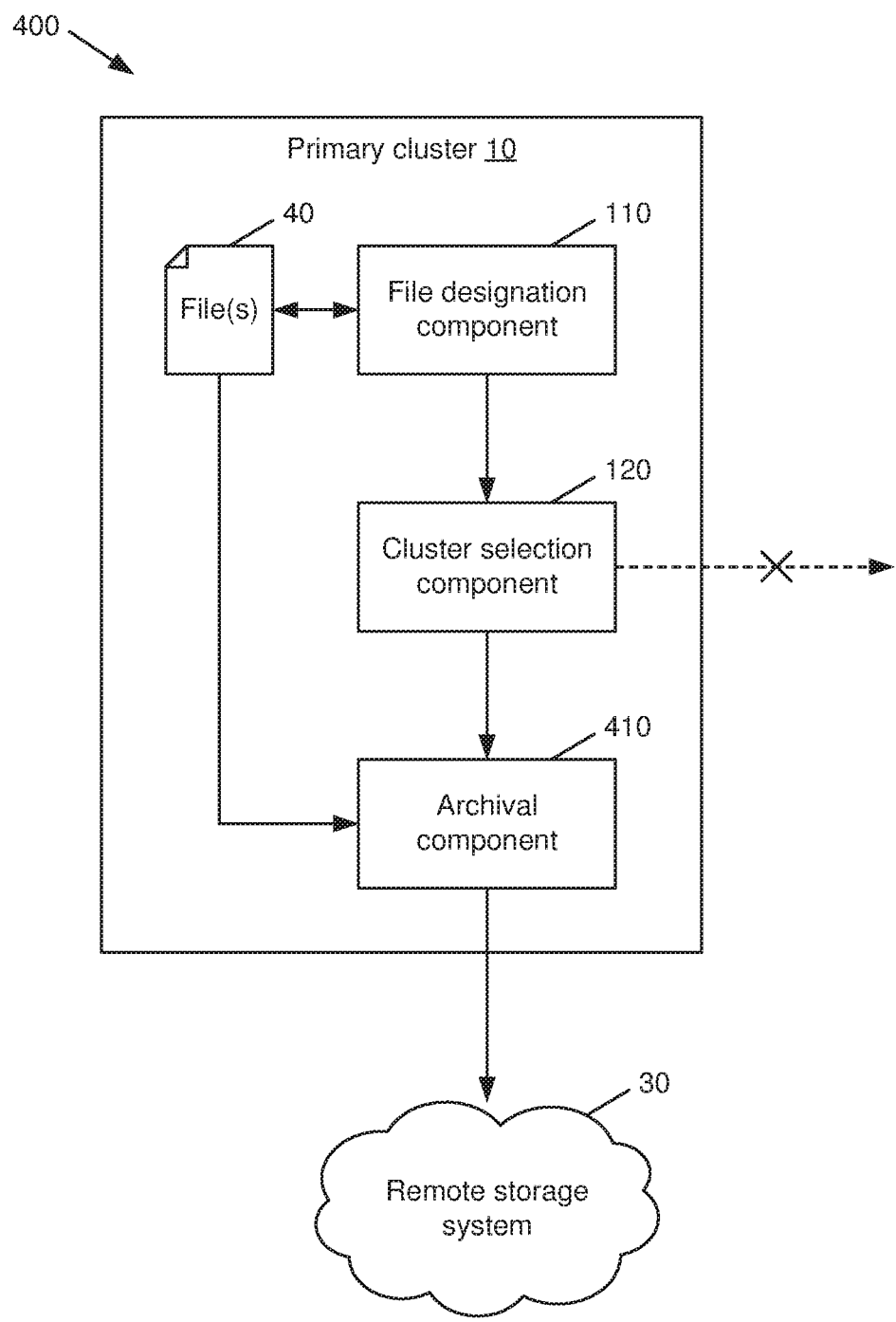
FIG. 4 is a flow diagram of a method for selecting a secondary cluster for archival job execution in accordance with various aspects described herein.

At 304, the primary cluster 10 can direct archival of the file 40 based on the number of secondary clusters 20 that were identified at 304. If no secondary clusters 20 containing a copy of the designated file were identified at 304, e.g., because the designated file is not associated with a replication policy or no replications have been performed for the file, method 300 can proceed to 306, wherein the file is archived locally at the primary cluster 10. An example of this scenario is shown by system 400 in FIG. 4. As FIG. 4 illustrates, in the event that no suitable secondary clusters 20 are found by the cluster selection component 120 with respect to replication of a given file 40, the primary cluster can, e.g., via an archival component 410, archive the file 40 to a remote storage system 30 locally. File archival techniques that can be utilized by the archival component 410, e.g., either at the primary cluster 10 or a secondary cluster 20, are described in further detail below with respect to FIG. 8.

Returning to 304, if a single secondary cluster 20 containing a copy of the designated file is identified at 302, method 300 can conclude at 308, in which the identified secondary cluster 20 can be selected for archival. Alternatively, if two or more secondary clusters 20 that each contain a copy of the designated file are identified at 302, method 300 can proceed from 304 to 310, in which a secondary cluster 20 from among those identified at 302 can be selected based on a degree of similarity between configurations of the primary cluster 10 and each identified secondary cluster 20. In an example as shown in FIG. 3, the cluster selection component 120 can determine at 310 whether any of the secondary clusters 20 identified at 302 utilize a same file system version as the primary cluster 10. If a secondary cluster 20 with a matching file system version is found, method 300 can conclude at 312, in which the secondary cluster 20 with the same file system version is identified for archival. In contrast, if none of the secondary clusters 20 have the same file system version as the primary cluster, method 300 can instead conclude at 314, in which a secondary cluster 20 having a closest file system version to the primary cluster 10, e.g., a latest file system version, is selected for archival.

While the acts described with respect to 310-314 as described above relate to file system version, it should be appreciated that any suitable configuration parameter(s) could be used in addition to, or instead of, file system information. For instance, selection of a secondary cluster 20 at 310 could also be performed on the basis of hardware configuration, network parameters such as a ping registered between the primary cluster 10 and each of the secondary clusters 20, etc.

Figure 5:
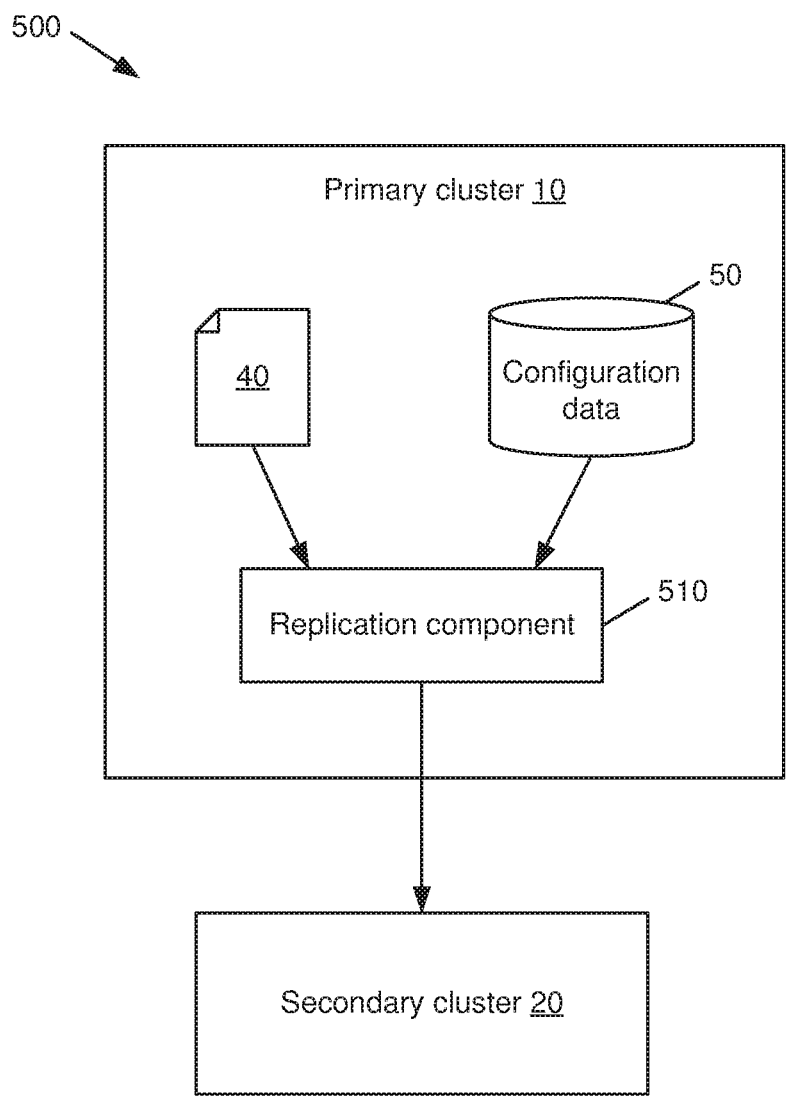
FIG. 5 is a block diagram of a system that facilitates data replication from a primary cluster to a secondary cluster in accordance with various aspects described herein.

Referring next to FIG. 5, a block diagram of a system 500 that facilitates data replication from a primary cluster 10 to a secondary cluster 20 in accordance with various aspects described herein is illustrated. Repetitive description of like elements employed in other embodiments described herein is omitted for brevity. As shown by FIG. 5, system 500 includes a replication component 510 that can replicate respective files 40 stored by the primary cluster 10 to one or more secondary clusters 20, e.g., resulting in copies 42 of the files 40 (not shown in FIG. 5) being stored at the secondary cluster(s) 20. In an aspect, data replication from the primary cluster 10 to a secondary cluster 20 can occur regularly, e.g., according to a schedule, and/or in response to various conditions. Schedules, conditions, and/or other factors that can cause data replication from the primary cluster 10 to a secondary cluster 20 can be defined by one or more replication policies, e.g., as described above. In another aspect, replication of data from the primary cluster 10 to a secondary cluster 20 can occur in any suitable manner, e.g., according to one or more replication techniques known in the art.

As further shown by FIG. 5, the replication component 510 can replicate configuration data 50 associated with the primary cluster 10 to one or more secondary clusters 20 in addition to respective files 40 as described above. In an aspect, configuration data 50 replicated to a secondary cluster 20 via the replication component 510 can include data associated with the remote storage system 30 utilized for archival, e.g., server addresses and/or other location information associated with the remote storage system 30, authentication credentials, or the like. Subsequently, the archival management component 130 (e.g., as shown by system 100 in FIG. 1) can direct a selected secondary cluster 20 to archive its copy of a given file to a remote storage system 30 according to the configuration data 50 for the remote storage system 30 as replicated by the replication component 510.

Figure 6:
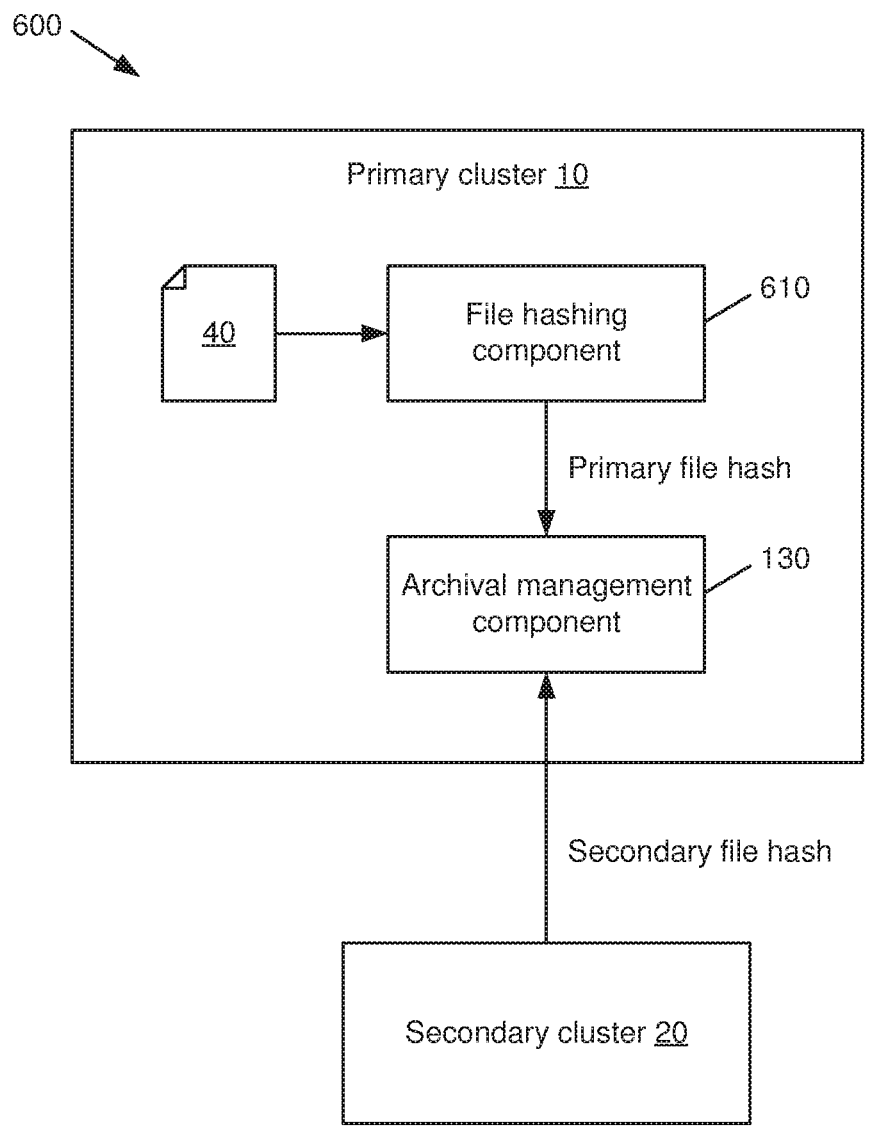
FIG. 6 is a block diagram of a system that facilitates detecting changes to a file based on file hash information in accordance with various aspects described herein.

Turning now to FIG. 6, a block diagram of a system 600 that facilitates detecting changes to a file 40 based on file hash information in accordance with various aspects described herein is illustrated. Repetitive description of like elements employed in other embodiments described herein is omitted for brevity. As described above with respect to FIG. 1, the archival management component 130 can direct a secondary cluster 20 to archive its local copy of a given file 40 in response to determining that the copy of the file 40 as stored by the secondary cluster 20 matches the file as stored at the primary cluster 10. In an aspect, the archival management component 130 can identify potential differences between a file 40 stored by the primary cluster 10 and a corresponding copy of the file 40 as stored by a secondary cluster 20 based on file hash information.

To the above ends, system 600 as shown in FIG. 6 can include a file hashing component 610 that can compute a first hash of a file 40 as stored by the primary cluster 10. This first file hash can then be compared by the archival management component 130 to a second hash corresponding to the copy of the file 40 as stored by a selected secondary cluster 20. Based on the two hashes, the archival management component 130 can determine whether the file 40 as stored by the primary cluster 10 has been altered subsequent to a copy of the file 40 being replicated to the secondary cluster 20 by comparing the first hash and the second hash.

As shown by FIG. 6, the second hash for the copy of the file 40 as stored by the secondary cluster 20 can be computed at the secondary cluster 20, e.g., in response to a command received from the archival management component 130. Alternatively, the second file hash associated with the copy of the file 40 as stored by the secondary cluster 20 can be computed at the primary cluster 10, e.g., by the file hashing component 610, based on a snapshot of the file 40 taken during the last replication of the file 40 to the secondary cluster 20 and/or other suitable information relating to the file. For instance, in an implementation in which the secondary cluster 20 remains idle (e.g., the secondary cluster 20 serves no I/O requests) while the primary cluster 10 is active, the file hashing component 610 can compute the second hash based on its existing file snapshot according to an assumption that the copy of the file 40 as stored at the secondary cluster 20 has not changed at the secondary cluster 20 since the last replication of the file 40 provided that the secondary cluster 20 has not been made active at any time since said replication. Other techniques for computing and/or comparing the respective file hashes could also be used.

Figure 7:
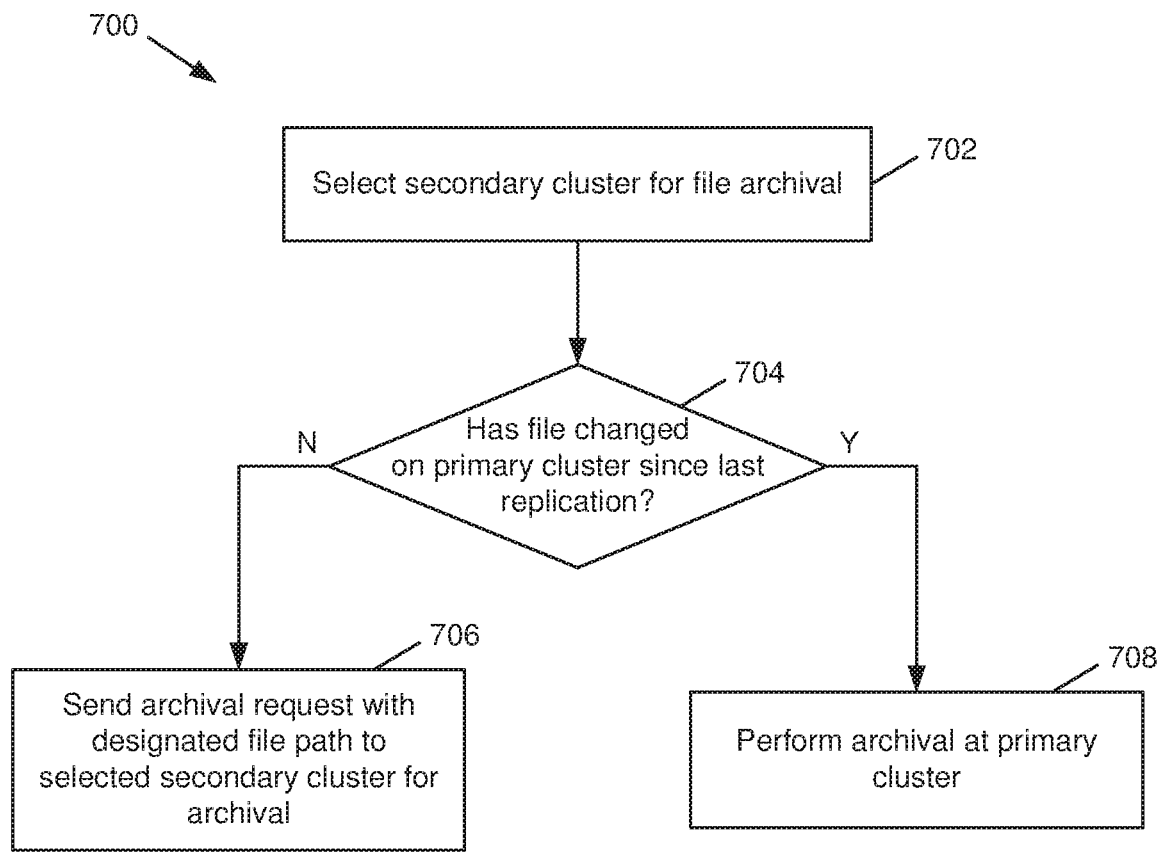
FIG. 7 is a flow diagram of a method for directing file archival in a data storage system in accordance with various aspects described herein.

Turning now to FIG. 7, a flow diagram of a method 700 for directing file archival in a data storage system in accordance with various aspects described herein is illustrated. At 702, a suitable secondary cluster 20 can be selected for archival of a designated file 40, e.g., by the cluster selection component 120 of a primary cluster 10 according to the techniques described above with respect to method 300 in FIG. 3 and/or any other suitable techniques.

At 704, the primary cluster 10, e.g., via an archival management component 130, can determine if the designated file 40 has changed since its last successful replication, e.g., based on file hash information as described above with respect to FIG. 6.

If the file 40 is determined not to have changed since its last replication, method 700 can conclude at 706, wherein archival request can be sent to the secondary cluster 20 selected at 702. In an aspect, the request can include information such as the file path of the file 40 and/or any other suitable information.

In contrast, if the file 40 is determined at 704 to have changed since its last replication, method 700 can instead conclude at 708, wherein archival of the file 40 is performed at the primary cluster 10, e.g., by an archival component 410 as described above with respect to FIG. 4.

Figure 8:
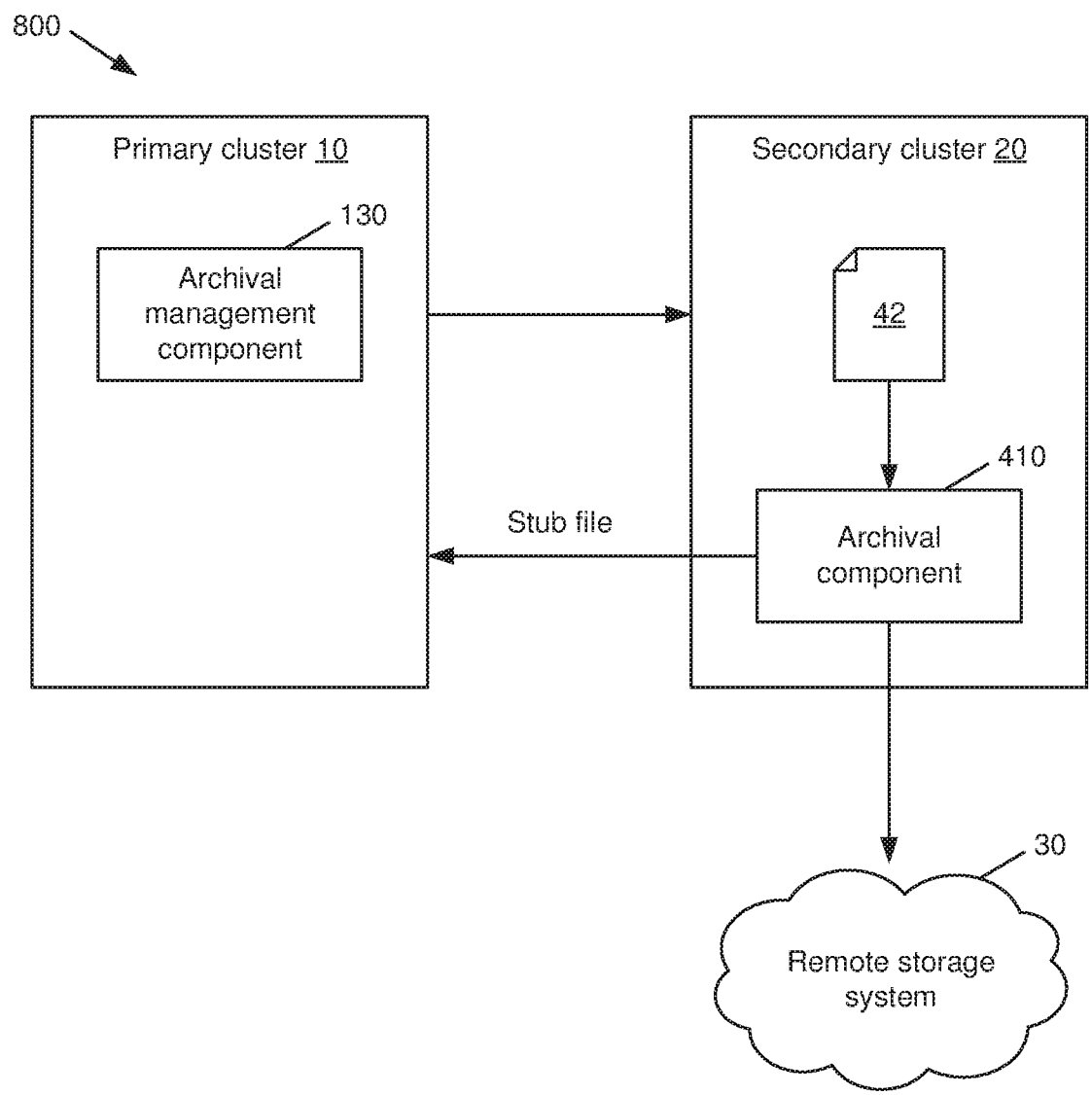
FIG. 8 is a block diagram of a system that facilitates processing a data archival task via a secondary cluster in accordance with various aspects described herein.

With reference next to FIG. 8, a block diagram of a system 800 that facilitates processing a data archival task via a secondary cluster 20 in accordance with various aspects described herein is illustrated. Repetitive description of like elements employed in other embodiments described herein is omitted for brevity. As described above, a primary cluster 10, e.g., via an archival management component 130, can initiate an archival job for one or more given files 40 at a secondary cluster 20 by sending a corresponding request to the secondary cluster 20. In an aspect, this request can be sent as a hypertext transfer protocol (HTTP) request and/or in any other suitable format. The request can include the file(s) to be archived along with their respective file paths. Also or alternatively, an archival request sent by the primary cluster 10 can specify whole directories, volumes, and/or other units of data for archival along with their respective paths if applicable.

In an aspect, the secondary cluster 20 can initiate the archival process for its copy 42 of the file 40 designated by the primary cluster 10 in response to receiving an archive request from the primary cluster 10. In one example, the secondary cluster 20 can archive the copy 42 of the file 40 via an archival component 410 that can operate in a similar manner to that described above with respect to FIG. 4. More particularly, the archival component 410 of the secondary cluster 20 can upload and/or otherwise transfer the copy 42 of the file 40 to a remote storage system 30, e.g., using credentials and/or other configuration data 50 for the remote storage system 30 as provided to the secondary cluster 20 in the manner described above with respect to FIG. 5. Once archival of the copy 42 of the file 40 to the remote storage system 30 is complete, the remote storage system 30 can return a stub file to the secondary cluster, which can be forwarded to the primary cluster 10. This stub file and its contents are described in further detail below.

In another aspect, a new copy of the designated file 40 can be received by the secondary cluster 20 (e.g., due to the primary cluster 10 initiating replication of the same file 40 during the archival process at the secondary cluster 20, etc.) while the original copy 42 of the file 40 is being archived. In this case, the secondary cluster 20, e.g., via the archival component 410, can handle archival using techniques that are similar to techniques known in the art for processing a client write request to a file 40 that is being archived by a single computing cluster.

Figure 9:
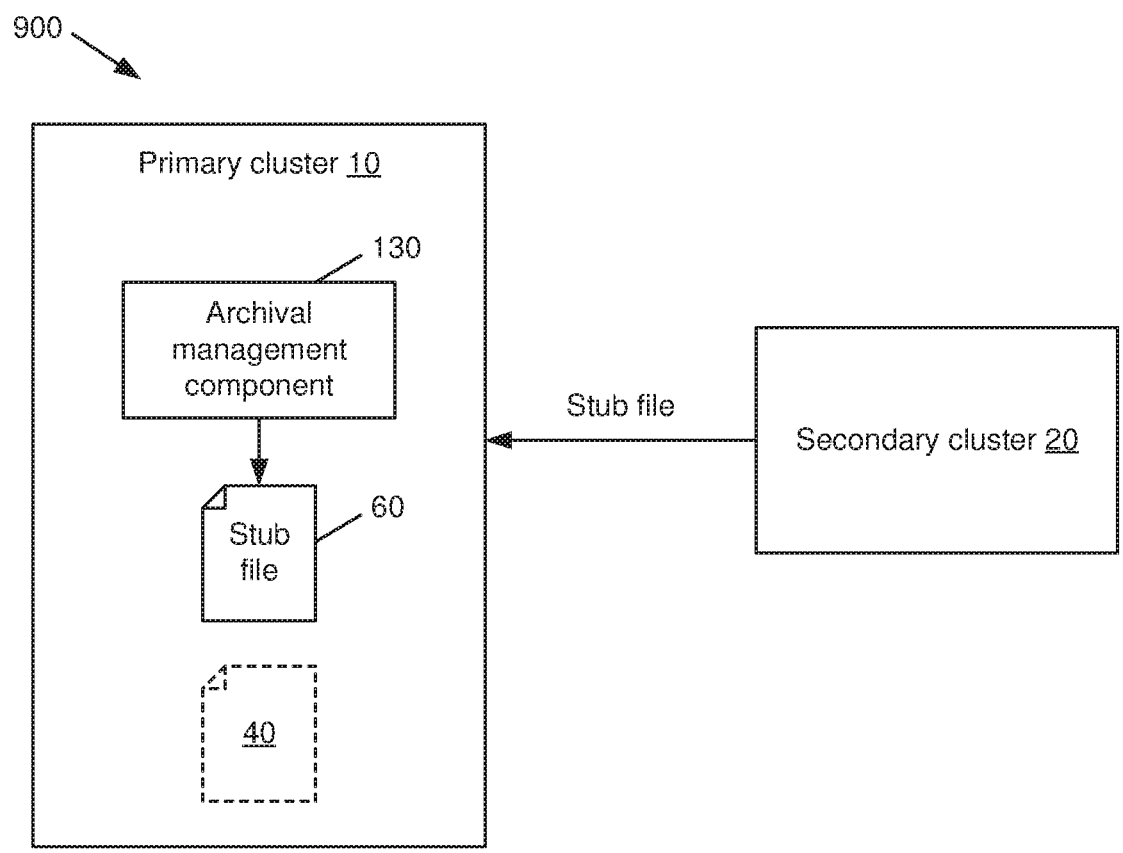
FIG. 9 is a block diagram of a system that facilitates replacement of an archived file with a stub file in accordance with various aspects described herein.

Turning now to FIG. 9, a block diagram of a system 900 that facilitates replacement of an archived file 40 with a stub file 60 in accordance with various aspects described herein is illustrated. Repetitive description of like elements employed in other embodiments described herein is omitted for brevity. As described above, upon successfully archiving a file 40 at a remote storage system 30 (e.g., via a primary cluster 10 or a secondary cluster 20), the remote storage system 30 can return a stub file 60 corresponding to the file 40 to the cluster that performed the archival task. In the example shown by FIG. 9, in response to the secondary cluster 20 receiving a stub file 60 in response to successfully archiving a target file 40, the secondary cluster 20 can forward the stub file 60 to the primary cluster 10, e.g., as a response to an archival request sent from the primary cluster 10 to the secondary cluster 20 pertaining to the file 40.

In an aspect, upon receiving the stub file 60 corresponding to an archived file 40 from a designated secondary cluster 20, the primary cluster (e.g., via the archival management component 130) can replace the original file 40 with the received stub file 60 and then delete and/or otherwise remove the original file 40, thereby completing the archival process.

The stub file 60 received by the primary cluster 10 can contain metadata corresponding to the original file 40 and/or the remote storage system 30. For instance, the stub file 60 can include a link and/or other redirect to a location at the remote storage system 30 at which the original file 40 is stored, thereby enabling access to the original file 40 via requests served for the stub file 60.

In an aspect, the archival management component 130 can also be configured to handle respective contingencies that can occur during the process of file archival at a designated secondary cluster 20. For instance, in the event that a write request is received at the primary cluster 10 corresponding to a file currently being archived at a secondary cluster 20, the archival management component 130 can process the write request according to one or more techniques for handling simultaneous write and archival operations. For instance, in the event that the secondary cluster 20 returns a stub file for a given file 40 and the primary cluster 10 determines (e.g., based on file hash information) that the file 40 has changed at the primary cluster 10 during the archival process, the primary cluster 10 can reject the stub file 60 and either instruct the secondary cluster 20 to archive the file again or process the archival task locally, e.g., via an archival component 410 as described above with respect to FIG. 4. As another example, in the event that a secondary cluster 20 does not respond to an archival request within a designated timeout interval, the primary cluster 10 can default to archiving the file locally as described above.

Figure 10:
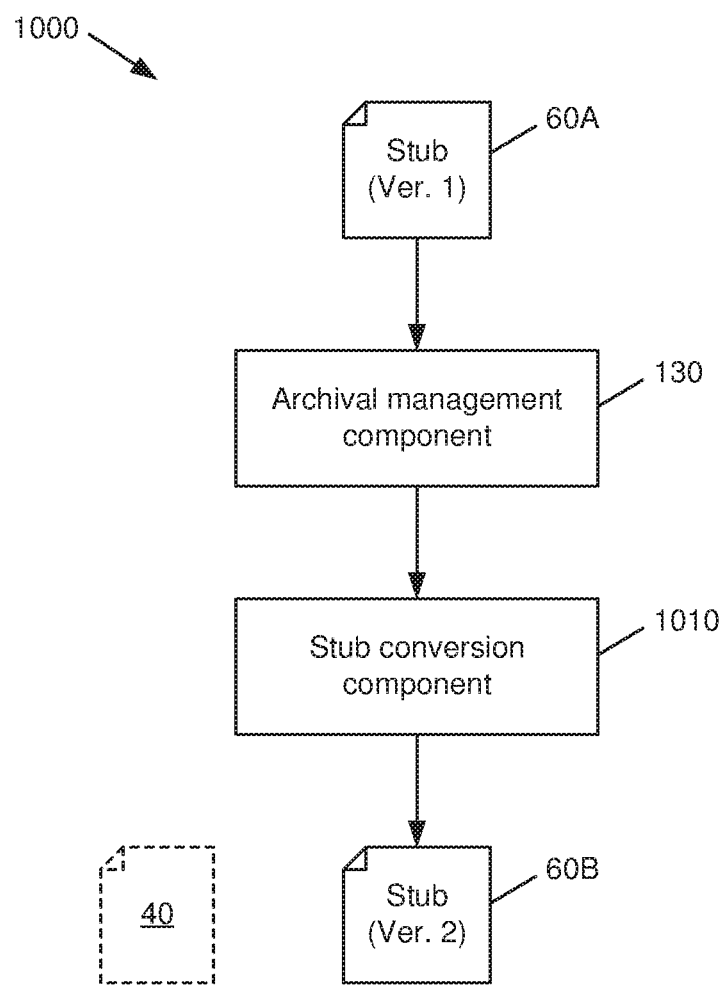
FIG. 10 is a block diagram of a system that facilitates stub file format conversion in accordance with various aspects described herein.

In another aspect, as illustrated by system 1000 in FIG. 10, a stub file 60A received from a secondary cluster 20 can in some cases differ in format, configuration, and/or other properties as compared to the stub file properties utilized by the primary cluster 10. This can occur, e.g., due to version differences between the primary cluster 10 and the secondary cluster 20 and/or other causes. As shown by system 1000, in response to the archival management component 130 determining that a first configuration associated with the stub file 60A received from a secondary cluster 20 differs from a second configuration used by the primary cluster 10 associated with the archival management component 130, the archival management component 130 can direct a stub conversion component 1010 to adapt the stub file 60A to the configuration associated with the primary cluster 10, resulting in an adapted stub file 60B. The archival management component 130 can then replace the associated archived file 40 with the adapted stub file 60B in a similar manner to that described above with respect to FIG. 9.

The stub conversion component 1010 of system 1000 can upgrade and/or otherwise generate an adapted stub file 60B based on a received stub file 60A using any suitable technique(s). For instance, in the event that the primary cluster 10 and secondary cluster 20 utilize different operating systems and/or operating system versions, the stub conversion component 1010 can execute a hook to convert the stub file from the version associated with the secondary cluster 20 to the version associated with the primary cluster 10. Other techniques could also be used.

Figure 11:
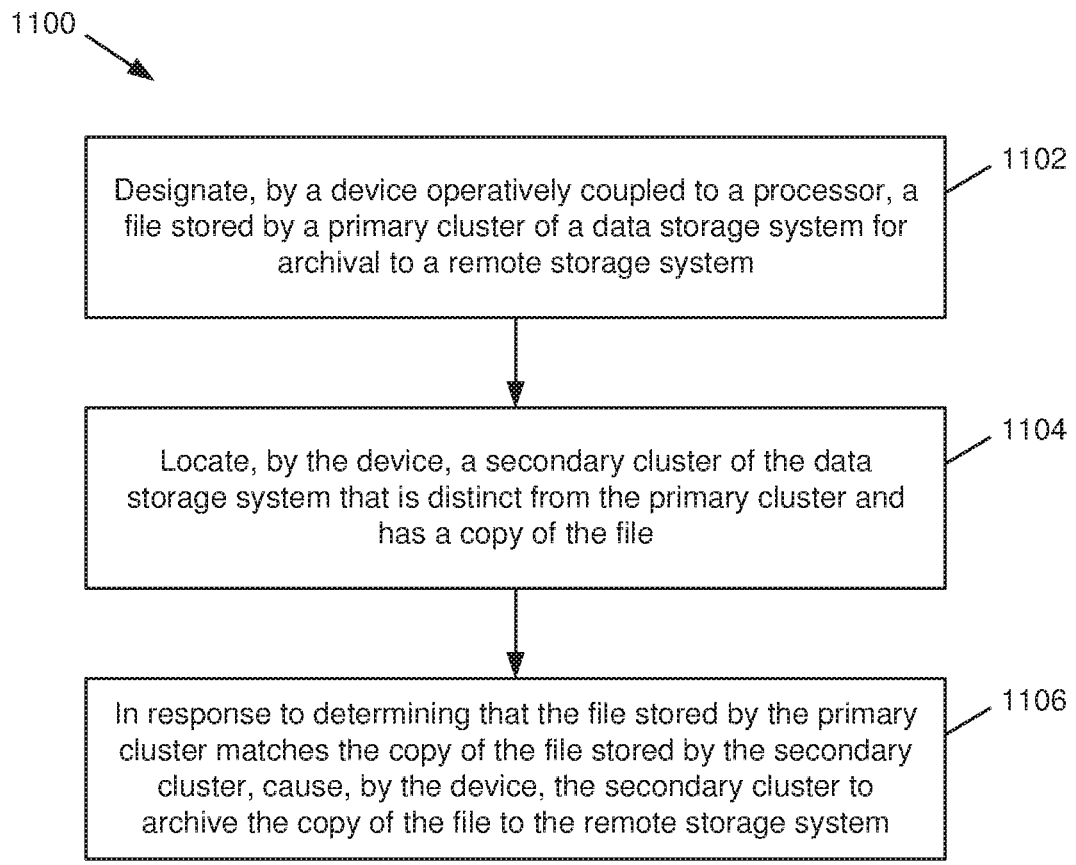
FIG. 11 is a flow diagram of a method that facilitates archival task processing in a data storage system in accordance with various aspects described herein.

Referring next to FIG. 11, a flow diagram of a method 1100 that facilitates archival task processing in a data storage system in accordance with various aspects described herein is illustrated. At 1102, a device operatively coupled to a processor can designate (e.g., by a file designation component 110) a file (e.g., a file 40) stored by a primary cluster of a data storage system (e.g., a primary cluster 10) for archival to a remote storage system (e.g., a remote storage system 30).

At 1104, the device can locate (e.g., by a cluster selection component 120) a secondary cluster of the data storage system (e.g., a secondary cluster 20) that is distinct from the primary cluster and that contains a copy of the file designated at 1102 (e.g., a copy 42 of the file 40).

At 1106, in response to determining that the file stored by the primary cluster matches the copy of the file stored by the secondary cluster, the device can (e.g., by an archival management component 130) cause the secondary cluster to archive the copy of the file stored on the secondary cluster to the remote storage system.

FIGS. 3, 7, and 11 as described above illustrate methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 12:
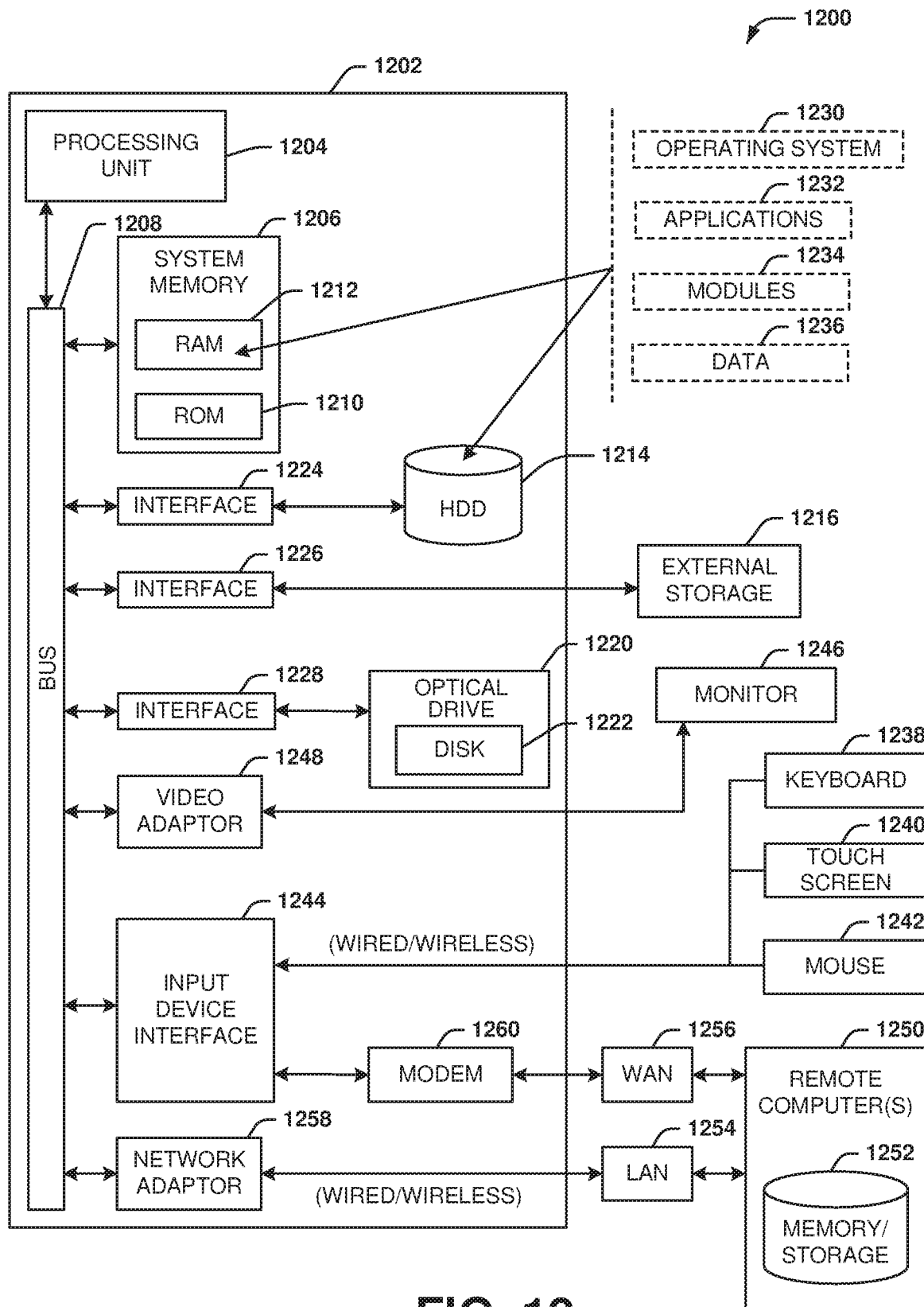
FIG. 12 is a diagram of an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD), a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
   a memory that stores computer executable components; and
   a processor that executes computer executable components stored in the memory, wherein the computer executable components comprise:
      a file designation component that selects a file stored by a primary computing cluster of the data storage system for archival to a remote storage system;
      a cluster selection component that identifies secondary computing clusters of the data storage system that are distinct from the primary computing cluster and have respective copies of the file, wherein the cluster selection component selects, from the secondary computing clusters after identifying the secondary computing clusters and in response to determining that respective second file systems of the secondary computing clusters utilize second file system versions that are different from a first file system version of a first file system utilized by the primary computing cluster, a first secondary computing cluster having a second file system, of the second file systems, that utilizes a second file system version, of the second file system versions, that is closest to the first file system version; and
      an archival management component that, in response to determining that a copy, of the respective copies of the file and stored by the first secondary computing cluster, matches the file stored by the primary computing cluster, directs the first secondary computing cluster to archive the copy of the file to the remote storage system instead of the primary computing cluster.

2. The data storage system of claim 1, wherein the cluster selection component further selects the first secondary computing cluster based on a degree of similarity between a first hardware configuration of the primary computing cluster and a second hardware configuration of the first secondary computing cluster.

3. The data storage system of claim 1, wherein the computer executable components further comprise:
   a replication component that replicates the file from the primary computing cluster to the first secondary computing cluster, resulting in the copy of the file being stored at the first secondary computing cluster.

4. The data storage system of claim 3, wherein the replication component further replicates configuration data for the remote storage system from the primary computing cluster to the first secondary computing cluster, resulting in replicated configuration data, and wherein the archival management component directs the first secondary computing cluster to archive the copy of the file to the remote storage system according to the replicated configuration data.

5. The data storage system of claim 3, wherein the archival management component determines whether the copy of the file as stored by the first secondary computing cluster matches the file stored by the primary computing cluster by determining whether the file as stored by the primary computing cluster has been altered subsequent to the copy of the file being replicated to the first secondary computing cluster.

6. The data storage system of claim 5, wherein the computer executable components further comprise:
   a file hashing component that computes a first hash of the file as stored by the primary computing cluster, wherein the archival management component obtains a second hash of the file as stored by the first secondary computing cluster and determines whether the file as stored by the primary computing cluster has been altered subsequent to the copy of the file being replicated to the first secondary computing cluster by comparing the first hash and the second hash.

7. The data storage system of claim 1, wherein the archival management component receives a stub file corresponding to the file from the first secondary computing cluster in response to the first secondary computing cluster successfully archiving the copy of the file to the remote storage system.

8. The data storage system of claim 7, wherein the archival management component replaces the file as stored by the primary computing cluster with the stub file in response to receiving the stub file from the first secondary computing cluster.

9. The data storage system of claim 7, wherein the computer executable components further comprise:
   a stub conversion component that converts the stub file from a first version, associated with a first operating system version used by the first secondary computing cluster, to a second version, associated with a second operating system version used by the primary computing cluster, in response to determining that the first operating system version configuration differs from the second operating system version.

10. A method, comprising:
    designating, by a device operatively coupled to a processor, a file stored by a primary cluster of a data storage system for archival to a remote storage system;
    locating, by the device, a plurality of secondary clusters of the data storage system having stored thereon respective copies of the file, each of the plurality of secondary clusters being distinct from the primary cluster;
    selecting, by the device subsequent to the locating and in response to determining that respective second file systems of the secondary clusters utilize respective second file system versions that are different from a first file system version utilized by a first file system of the primary cluster, a secondary cluster from the plurality of secondary clusters having a second file system, of the second file systems, that utilizes a second file system version, of the second file system versions, that is closest to the first file system version; and in response to determining that the file stored by the primary cluster matches the copy of the file stored by the secondary cluster, causing, by the device, the secondary cluster to archive the copy of the file to the remote storage system.

11. The method of claim 10, wherein the selecting further comprises selecting the secondary cluster from among the plurality of secondary clusters further based on an extent to which a first hardware configuration of the primary cluster matches a second hardware configuration of the secondary cluster.

12. The method of claim 10, further comprising:
replicating, by the device, the file from the primary cluster to the secondary cluster, resulting in the copy of the file being stored at the secondary cluster.

13. The method of claim 12, further comprising:
replicating, by the device, configuration data relating to the remote storage system from the primary cluster to the secondary cluster, resulting in replicated configuration data, wherein the causing the secondary cluster to archive the copy of the file comprises directing the secondary cluster to archive the copy of the file to the remote storage system according to the replicated configuration data.

14. The method of claim 10, further comprising:
receiving, by the device, a stub file corresponding to the file from the secondary cluster in response to the secondary cluster successfully archiving the copy of the file to the remote storage system; and
replacing, by the device, the file as stored by the primary cluster with the stub file in response to the receiving the stub file.

15. A non-transitory machine-readable medium comprising computer executable instructions that, when executed by a processor of a data storage system, facilitate performance of operations, the operations comprising:
selecting a file stored at a primary site of the data storage system for archival to a remote storage system;
identifying a plurality of secondary sites of the data storage system that contain respective copies of the file;
selecting, subsequent to the identifying and in response to determining that the plurality of secondary sites is associated with second operating system versions that differ from a first operating system version associated with the primary site, a secondary site from among the plurality of secondary sites in response to the secondary site being associated with a second operating system version, of the second operating system versions, that is closest to the first operating system version; and
in response to determining that the file stored at the primary site matches the copy of the file stored by the secondary site, directing the secondary site to archive the copy of the file to the remote storage system.

16. The non-transitory machine-readable medium of claim 15, wherein the operations further comprise:
selecting the secondary site from among the plurality of secondary sites further based on a comparison between a first hardware configuration of the primary site and respective second hardware configurations of the plurality of secondary sites.

17. The non-transitory machine-readable medium of claim 15, wherein the operations further comprise:
replicating the file from the primary site to the secondary site, resulting in the copy of the file being contained at the secondary site;
replicating credential data associated with the remote storage system from the primary site to the secondary site; and
directing the secondary site to archive the copy of the file to the remote storage system based on the credential data.

18. The non-transitory machine-readable medium of claim 15, wherein the operations further comprise:
receiving a stub file from the secondary site in response to the secondary site successfully archiving the copy of the file to the remote storage system; and
replacing the file as stored at the primary site with the stub file.

19. The non-transitory machine-readable medium of claim 18, wherein the operations further comprise:
converting the stub file from a first version, associated with the second operating system version, to a second version, associated with the first operating system version.

20. The data storage system of claim 1, wherein the cluster selection component identifies the plurality of secondary computing clusters based on a replication policy corresponding to a level of security associated with the file.

* * * * *